June 11, 1929.　　　L. WOJTYCSKI　　　1,717,294

TRANSMISSION DEVICE

Filed May 25, 1928　　　2 Sheets-Sheet 1

Louis Wojtycski INVENTOR

BY Victor J. Evans

ATTORNEY

June 11, 1929.　　　L. WOJTYCSKI　　　1,717,294
TRANSMISSION DEVICE
Filed May 25, 1928　　　2 Sheets-Sheet 2
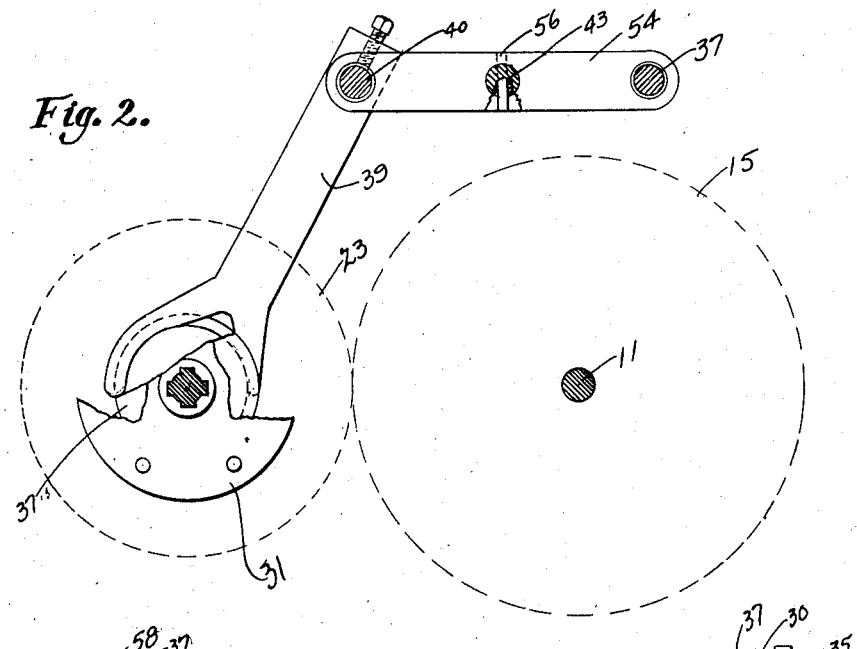
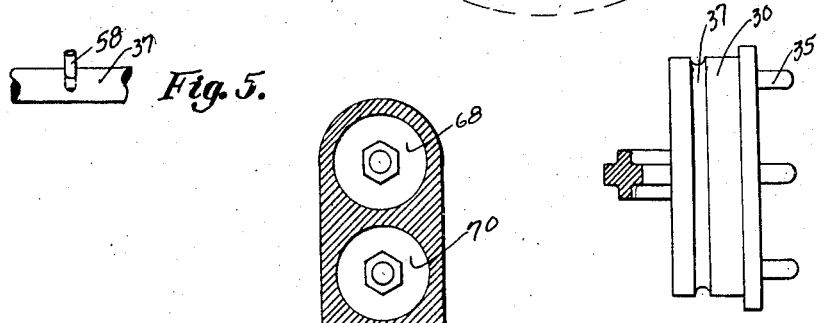
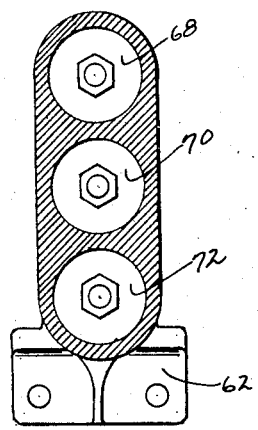
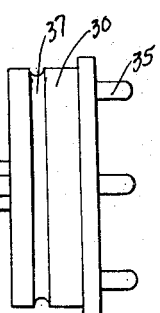
Louis Wojtycski INVENTOR
BY Victor J. Evans
ATTORNEY Patented June 11, 1929.

1,717,294

UNITED STATES PATENT OFFICE.

LOUIS WOJTYCSKI, OF MILWAUKEE, WISCONSIN.

TRANSMISSION DEVICE.

Application filed May 25, 1928. Serial No. 280,633.

This invention relates to certain novel improvements in transmission devices for automotive vehicles and the like and has for its principal object the provision of an improved construction of this character which will be highly efficient in use and economical in manufacture.

It is among the objects of my invention to provide a transmission of the foregoing character which will be automatic in operation and I preferably arrange the device in such a manner that the air action in the intake manifold of the internal combustion engine with which the device is to be associated, may be utilized for this purpose.

Another object of the invention is to arrange a device such that it may be operated by air pressure created by suitable mechanism arranged in association with the internal combustion engine.

Another object of the invention is to arrange the device such that it will embody a speed control device which will operate in accordance with the speed at which the engine and the vehicle are moving so as to cause successive operation of the parts of the transmission.

A still further object of the invention is to arrange the device in such a manner that it will embody a plurality of valves adapted to control the air passage from the intake manifold or from a pressure tank so as to control passage thereof to succeeding cylinders having pistons therein connected to the operating parts of the transmission.

Other objects will appear hereinafter.

The invention consists in the novel combination and arrangement of parts to be hereinafter described and claimed.

The invention will be best understood by reference to the accompanying drawings, showing the preferred form of construction and in which:—

Fig. 2 is a sectional view taken substantially on the line 2—2 on Fig. 1.

Fig. 3 is a sectional view taken substantially on the line 3—3 on Fig. 1.

Fig. 4 is a view depicting one of the shifting devices such as are employed in my device; and Fig. 5 is a detail view depicting a connecting construction employed in the device.

Figure 1:
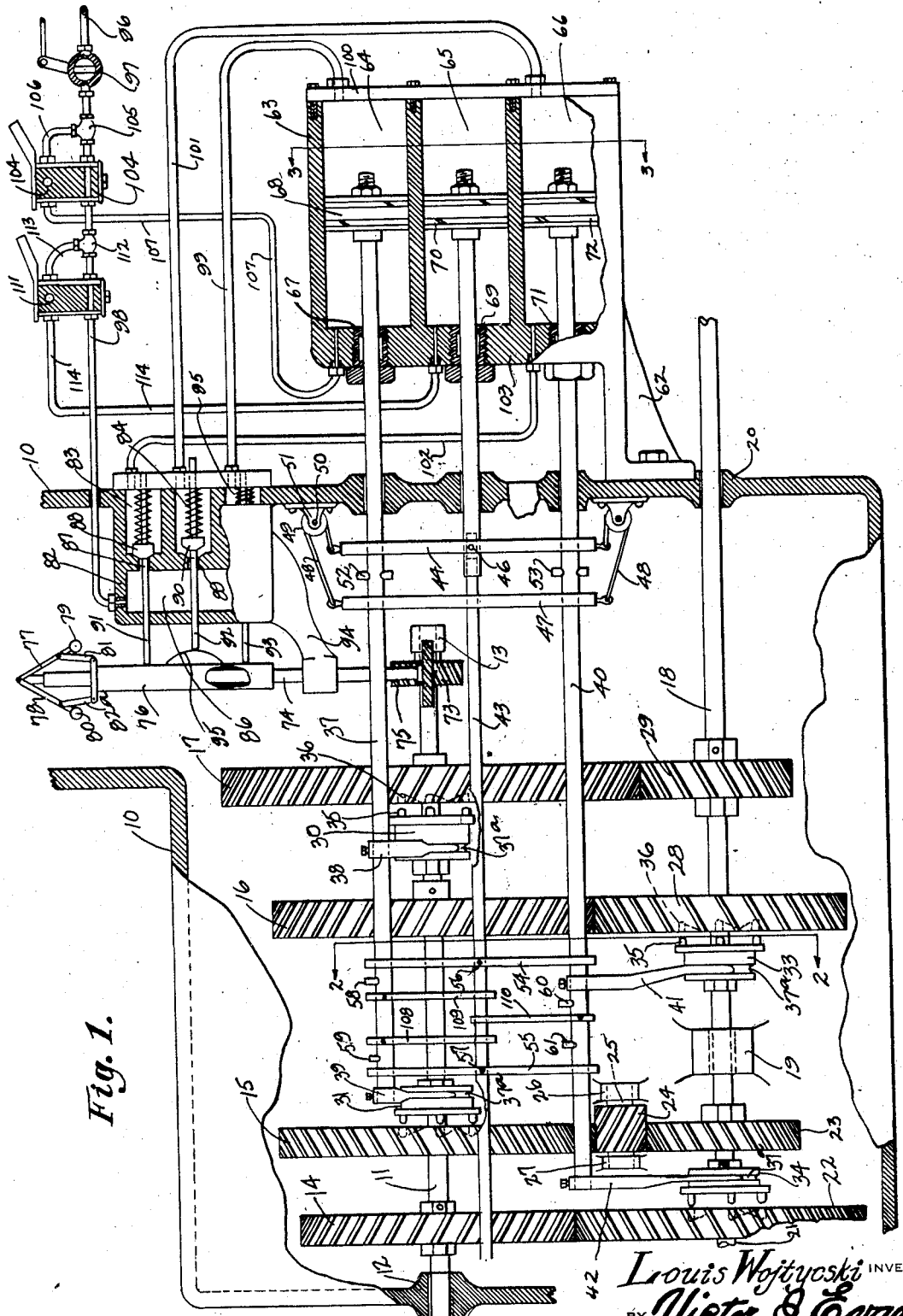
Fig. 1 is a transverse sectional view of a transmission constructed in accordance with a preferred embodiment of my invention.

In the drawings, wherein I have illustrated a preferred embodiment of my invention, 10 indicates the housing for my improved transmission. A shaft, indicated at 11, is journalled in bearings 12 and 13 provided in the housing 10. Mounted on the shaft 11 adjacent the bearing 12, is a gear 14 which is fixed thereto. Mounted on the shaft 11 adjacent the gear 14 is a gear 15 and this gear is freely rotatable on the shaft 11. A gear 16 is mounted on the shaft 11 in spaced relation with respect to the gear 15 and this gear is fixed to said shaft. A gear 17 is mounted on the shaft 11 in juxtaposition to the gear 16 and this gear is freely rotatable on said shaft. The shaft 11 will be known hereinafter as the power supplying shaft.

Mounted in the housing 10 in spaced relation with respect to the shaft 11 is a shaft 18 which is rotatably journalled in bearings 19 and 20 provided in the housing 10. A stub shaft 21 is journalled in suitable bearings (not shown) which are provided in the housing 10 and this shaft 21 is aligned axially with the shaft 18. Mounted on the stub shaft 21 and fixed thereto is a gear 22 and this gear 22 meshes with the gear 14. Fixedly mounted on the shaft 18 in alignment with the gear 15 is a gear 23. The gear 23 meshes with the pinion 24 mounted on the shaft 25 that is journaled in bearings 26 and 27 and the gear 15 on the shaft 11 also meshes with this pinion 24 and thus the gears 15 and 23 are connected through the pinion 24 for co-operating movement. Mounted on the shaft 18 in spaced relation to the gear 23 is a gear 28 which meshes with the gear 16 on the shaft 11. This gear 28 is freely rotatable on the shaft 18. Fixed to the shaft 18 is a gear 29 which meshes with the gear 17 in the shaft 11.

As is clearly illustrated in Fig. 1, a portion of the shaft 18 extends extraneous the housing 10 and is connected to the usual clutch structure provided in automotive vehicles it being understood that said clutch structure is interposed between said shaft 18 and the prime mover of a vehicle which may be an internal combustion engine or the like. The stub shaft 21 extends extraneous the housing 10 and is adapted to be connected to power receiving mechanisms such as the rear wheels of the vehicle. The power input to shaft 18 is adapted to be transmitted to the shaft 21 through the various gears hereintofore described which are selectively connected so as to operate in a manner to be set forth hereinafter.

Mounted on the shaft 11 and connected thereto by a key structure of any approved type, so as to be rotatable with said shaft, is a shifting member 30. This shifting member 30 is disposed in juxtaposition to the gear 17 on the side thereof disposed toward the gear 16. A similar shifting member 31 is similarly mounted on the shaft 11 and is juxtaposed the gear 15 on the side thereof disposed toward the gear 16. A shifting member 33 is connected through a suitable key construction to the shaft 18 so as to be rotatable therewith and this shifting member 33 is disposed in juxtaposed relation to the gear 28 on the side thereof disposed toward the gear 23. A similar shifting member 34 is similarly connected to the shaft 18 and is disposed in juxtaposition to the gear 22 on the side thereof disposed toward the gear 23. The shifting members 30, 31, 33, and 34 are provided with pins 35 on the faces thereof disposed toward the juxtaposed gears. These pins 35 are arranged around the periphery of the members 30. Similarly arranged in the juxtaposed gears are a plurality of sockets 36 and when the shifting members are moved toward the juxtaposed gears, the pins 35 are adapted to enter these sockets 36. The shifting members also include a rearwardly extending portion in which a groove 37ª is provided that is adapted to receive the arms of the various shifting forks that are associated therewith.

Disposed above the shaft 11 is a shifting rod 37 which is slidable axially with respect to the shaft 18. A shifting fork 38 is mounted on the shifting rod 37 and has arms that are disposed in the groove 37ª of the shifting member 30. A shifting fork 39 is mounted on the shaft 37 and the arms thereof are disposed in the groove 37ª of the shifting member 31. Another shifting rod 40 is associated with the shaft 18 and this shifting rod has a shifting fork 41 mounted thereon which has the arms thereof disposed in the groove 37ª of the shifting means 33. Another shifting member 42 is mounted on the shifting rod 40 and the arms of this shifting member are disposed in the groove 37ª of the shifting member 34. It is apparent that the arrangement of the shifting members 30 and 31 and the shifting forks 38 and 39 is such that when the shifting rod 37 is moved in one direction, the shifting member 30 will be moved into engagement with the gear 17 and when said shifting rod is moved in the opposite direction the shifting member 31 will be moved into engaging position with the gear 15. It is also apparent that this arrangement is such that these shifting members may be disposed in a neutral or disengaging position with respect to both of these gears. Similarly the shifting member 33 is adapted to be moved into engagement with the gear 28 when the rod 40 is moved in one direction and the shifting member 34 is adapted to engage the gear 21 when said rod 40 is moved in the other direction, it being understood that said rod may also be moved so as to arrange these shifting members 33 and 34 in a neutral position as is illustrated in Fig. 1.

Mounted in suitable bearings provided in the main housing 10 is a shifting rod 43. Mounted on this rod adjacent one end of the housing 10 is an arm 44 which is pivotally connected to said shaft 43 as indicated at 46. Slidably mounted on the shaft 43 in juxtaposition to the arm 44 is an arm 47. The corresponding ends of the arms 44 and 47 are connected through cables 48 that are directed around sheaves 49 mounted on shafts 50 which are journalled in bearings 51 mounted on a wall of the housing 10. It is therefore apparent that when the shaft 43 is moved in one direction, the arm 44 will be moved in the same direction while the arm 47 will be moved in the opposite direction. Mounted on the rod 37 are lugs 52 which are disposed between the arms 44 and 47. Similar lugs 53 are similarly disposed on the rod 40. Therefore when the arms 44 and 47 are moved in the manner hereintofore set forth, it is apparent that one of these arms will engage the lugs 52 and will thus cause either the rod 37 or 40 or both of said rods to be moved with said rod 43.

Pivotally mounted on the rod 43, on the portion thereof extending between the gears 15 and 16, are arms 54 and 55 pivoted as indicated at 56 and 57. Suitable lugs 58 and 59 are mounted on the rod 37 and are adapted to be selectively engaged by the ends of the arms 54 and 55 juxtaposed thereto when said arms are moved in a manner hereintofore set forth. Similar lugs 60 and 61 are mounted on the rod 40 and these lugs are also adapted to be engaged at predetermined times with the ends of the arms 54 and 55 that are juxtaposed thereto.

Secured to the end of the housing 10 from which the end of the shaft 18 extends is a bracket 62. On this bracket 62 is an auxiliary housing 63 in which three cylinders 64, 65 and 66 are provided. Cylinder 64 is disposed in alignment with the rod 37, said rod 37 extending into said cylinder through a suitable packing construction 67. On the end of the shaft 37 disposed in the cylinder 64 a piston 68 is mounted. The cylinder 65 is aligned with the rod 43 which extends therein through the packing construction 69 and a piston 70 is mounted on the end of said rod 43 that is disposed in said cylinder 65. Cylinder 66 is disposed in alignment with the rod 40 and said rod extends into said cylinder through a packing construction 71 and a piston 72 is mounted on the end of the rod 40 disposed in this cylinder. The pistons 68, 70, and 72 are respectively reciprocal in cylinders 64, 65 and 66.

It is apparent that under the normal operation of a machine, the shaft 11 will be continuously rotated. I provide a gear 73 which is fixed on shaft 11 for rotation therewith. A shaft 74 is provided which extends into the housing 10 and has a gear 75 provided thereon that meshes with the gear 73. A sleeve 76 is disposed around this shaft 74 and at the upper end of the shaft 74, arms 77 and 78 are pivotally connected. At the free ends of the arms 77 and 78 weight balls 79 and 80 are provided. The upper end of the sleeve 76 is connected to the arms 77 and 78 through links 81 and 82ª. The arms 77 and 78 have the weight balls at the end thereof and provide a governor device since the shaft 74 is rotated in proportion to the speed of rotation of the shaft 11, said rotative movement being transmitted from the shaft 11 to said shaft 74 through the gears 73 and 75. As said shaft 74 increases in rotative speed, it is apparent that the arms 77 and 78 will tend to spread out and inasmuch as the sleeve 76 is connected thereto said sleeve will tend to rise.

Provided in the housing 10 is a compartment 82 in which valve compartments 83, 84 and 85 are provided. At one end of the compartment 82 is a storage chamber 86 communication between the storage chamber 86 and the valve chamber 83 is obtained through a port 87 passage through which is controlled by valve 88. Communication between the chamber 86 and valve chamber 84 is established through a port 89 passage through which is controlled by a valve 90. Communication between the valve chamber 85 and the chamber 86 is attained through a port (not shown) communication through which is controlled by a valve (not shown). The valve 88 is mounted on a valve rod 91. The valve 90 is mounted on a valve rod 92 and the valve controlling communication between the chamber 86 and the chamber 85 is mounted on a valve rod 93. The valve rods 91, 92 and 93 extend toward the sleeve 76 which is adapted to be juxtaposed thereto. A bearing 94 is suspended from the wall providing the compartment 82 and the shaft 74 is journalled in this bearing 94 and this bearing 94 also serves to limit downward movement of said sleeve 76 when it is in at rest position.

When the sleeve 76 is disposed in at rest position, the cam 95 thereof bears against the valve rod 93 to move the valve seat thereon from closing position and thus establish communication between the chambers 85 and 86. This communication between these chambers is utilized in a manner now to be set forth.

As has been stated hereintofore, my improved device is actuated by suction created in the intake manifold of an internal combustion engine with which my device is adapted to be associated. A supply pipe 96 is provided which is connected to said intake manifold. A valve 97 is provided in this pipe 96 which is adapted to be controlled; that is, be operated by the depressing of the clutch pedal provided on the vehicle. To the opposite side of the valve 97 a supply pipe 98 has one end thereof connected and the opposite end of this pipe is in communication with the chamber 86.

When the valve 97 is in open position so as to establish communication between pipes 96 and 98, a vacuum is created in the chamber 86. Therefore when the valve chamber 85 is arranged so as to be in communication with said chamber 86, it is apparent that the vacuum is also created in this chamber 85. The chamber 85 is connected through a pipe 99 with the portion of the cylinder 64 disposed between a head 100 thereof and the piston 68. Therefore when the vacuum is created in the chamber 85 it is apparent that the vacuum will also be created in this portion of the cylinder 64 which will cause the piston 68 therein to move toward the head 100 thereof and as the piston 68 moves toward the head 100, shifting member 30 is moved such that the pins 35 thereof will enter the sockets 36 in the gear 17. The gear 17 meshes with the gear 29 and inasmuch as the shifting member 30 is connected to the shaft 11 for movement therewith, it is apparent that the movement of the shaft 18 will be transmitted through the gear 29 and the gear 17, the shifting member 30, to the shaft 11. This movement of the shaft 11 will be transmitted through the gear 14 to the gear 22 from whence it will be supplied to the shaft 21 which will transmit it to the driving mechanisms of the vehicle.

When the parts are in the foregoing position it is apparent that the shaft 11 will be rotated and as has been stated movement of the shaft 11 will be transmitted to the shaft 74 which will cause the governor device thereof to expand and elevate the sleeve 76. This will move the sleeve 76 upwardly into the position shown in Fig. 1 wherein the cam 95 is shown as to have disengaged the valve 93 and engaged the valve rod 92. In this manner communication is closed between the chambers 85 and 86 but communication is opened between chamber 86 and chamber 84. Chamber 84 is connected through a pipe 101 to the portion of the cylinder 66 between the head 100 thereof and the piston 72. It is therefore apparent that the piston 72 will be moved toward the head 100 and this movement will move the rod 40 which will act through the shifting fork 41 to bring the pins 35 of the shifting member 33 into the sockets 36 of the gear 28.

At the time the piston 68 moves toward the head 100 so as to move the shaft 37, the lug 58 moves to engage the end of the arm 54 and thus moves this arm in such a position that one end thereof will be engaging said lug 58 and the other end thereof will be engaging the lug 60. Therefore when the rod 40 is moved in the manner hereinbefore described it is apparent that the lug 60 will move the arm 54 which will in turn act on the lug 58 to move the shaft 37 and this will cause the shifting member 30 to disengage the gear 17 at the time the shifting member 33 engages the gear 28. The gear 28 is freely rotatable on the shaft 18 but the shifting member 33 is fixed thereto. Therefore said gear 28 will rotate and this rotation will be transmitted to gear 16 which is fixed to shaft 11 and the rotative movement imparted to shaft 11 will be transmitted to the gear 14 to the gear 22 and thence to the shaft 21 which will operate in the manner hereinbefore set forth. It is to be understood that this changing from the engagement of the gears 29 and 17 to the engagement of the gears 28 and 16 will take place only when the clutch pedal which controls the operation of the valve 97 will be operated which will establish communication between the pipes 96 and 98.

As the speed of rotation of the shaft 74 increases the sleeve 76 will move to a higher position and thus the cam 95 will dis-engage the valve rod 92 and will engage the valve rod 91 and thus permit reseating of the valve 90 and unseat the valve 88. This will establish communication between chambers 83 and 86. The chamber 83 is connected through a pipe 102 to a portion of the cylinder 66 disposed between the head 103 thereof and the piston 72. Therefore this suction will cause the piston 72 to move toward the head 103. This action will dis-engage the shifting member 33 from the gear 28 and at the time the shifting member 33 dis-engages the wheel 28 the shifting fork 42 will move the shifting member 34 into engagement with the gear 22. This therefore will directly connect the shaft 18 to the shaft 21 which is the usual direct connection employed in automotive vehicles.

It is understood that the engagement of the gears 29 and 17 serves as the low speed connection while the connection between the gears 28 and 16 serves as the intermediate gear connection while the direct coupling of the shafts 18 and 21 hereinbefore described serves as the high speed connection.

Arranged on the dash or instrument board of the vehicle or at any other or suitable point is a hand control valve 104. A T connection 105 is provided in the pipe 97 and a pipe 106 extends between this T connection and the valve 104. The valve 104 is also connected through a pipe 107 to a portion of the cylinder 64 disposed between the head 103 thereof and the piston 68. The valve 104 is arranged such that it embodies two passages one of which controls passage through the pipe 98 while the other establishes communication between the pipes 106 and 107. Therefore when the valve 97 is opened and when the valve 104 is disposed such that the port which establishes communication between the pipes 106 and 107 is opened, it being understood that at this time the port controlling communication through the pipe 98 is closed, and the suction created acts on the piston 68 so as to move the piston toward the head 103 which will also move the rod 37. Movement of the rod 37 in this direction will be transmitted through the shifting fork 39 to the shifting member 31 which will cause the pins 35 thereof to enter the socket 36 in the gear 15. As has been pointed out the gear 15 meshes with the pinion 34 which in turn meshes with the gear 23 which is fixed on the shaft 18. Therefore movement of the shaft 18 will be transmitted through the gear 23, pinion 24, gear 15, shaft 11, gear 14 to the shaft 21. It is apparent that the direction of rotation imparted, due to the presence of the pinion 24, will be in the direction opposite to that of the direction imparted by the remaining gears of the device and this therefore serves as a reverse gear. Fixed on the shaft 37 are two arms 108 and 109. Fixed on the shaft 40 and disposed between the arms 108 and 109 is an arm 110. In the event that the shifting members 33 or 34 are engaged at the time the rod 37 is moved to cause engagement of the shifting member 31, either the rod 108 or 109 will engage the rod 110 and will cause the shifting member 33 or 34 to be dis-engaged and it is apparent that if the shifting member 30 was engaged, movement of the rod 37 would cause engagement of the shifting member 31 causing withdrawal of this shifting member. It is apparent that only one gear and shifting member may be connected at any one time.

Mounted in juxtaposition to the valve 104 is a valve 111 which is also hand controlled. A T connection 112 is provided in the pipe 97 and a pipe 113 connects this T connection to the valve 111. The valve 111 is formed substantially similar to the valve 104 and embodies right angularly extending ports one of which establishes communication between the pipe 113 and the pipe 114 and the other of which establishes communication through the pipe 98 and these ports are disposed such that when one is in establishing communication the other is closed. When the valve is opened so as to establish communication between pipes 113 and 114 and the valve 97 is operated in the manner hereintofore set forth, the suction in the pipe 96 is caused to act through the pipe 114 connected to the valve 111. The pipe 114 is also connected to the area of the cylinder 65 between the piston 70 and the head 103. It is therefore apparent that movement will be imparted to the piston 70 which will cause said piston to move toward the head 103 and this movement will be imparted to the rod 43. The rod 43 will cause actuation of the arms 44 and 47 and these arms will engage either the lugs 52 or 53 as has been set forth and will move the rods 37 and 40 into position as shown in Fig. 1 which is the neutral position. As is clearly illustrated in Fig. 1, the valves 88 and 90 and the valve co-operating with the valve stem 93 are spring seated and it is therefore apparent that these valves remain closed at all times until opened by the action of the cam 95.

It is apparent from the foregoing description that I have provided a transmission mechanism which will be arranged so that the operation thereof may be controlled from the clutch pedal of a motor vehicle. The device is also arranged so that the successive gears in the mechanism may be successively engaged in proportion to the speed of the vehicle. It is also apparent that I have arranged the device such that the reverse gears may be brought into action only at desired times by the operation of suitable hand controlled mechanisms and it is apparent that the device may be set in neutral position by the operation of suitable hand controlled mechanisms.

While I have illustrated and described the preferred form of construction for carrying my invention into effect this is capable of variations and modifications without departing from the spirit of the invention. I, therefore, do not want to be limited to the precise details of construction set forth, but desire to avail myself of such variations and modifications as come within the scope of the appended claims.

Having thus described my invention what I claim as new and desire to protect by Letters Patent is:

1. In a device of the class described, a pair of co-operating shafts, pairs of intermeshing gears on said shafts, one gear of each set of gears being fixedly connected to the shaft on which it is mounted, means for selectively connecting the other gear of each set of gears to the shaft on which it is mounted, said means including members slidable on and keyed to said shafts, said members including portions adapted to engage said gears, means for operating said connecting means and means for controlling the operation of said operating means, said last named means including a speed control member, and means carried by said speed control member for operating means controlling the operation of said operating members.

2. In a device of the class described, a housing, shafts rotatably journalled in said housing, sets of intermeshing gears mounted on said shafts, one gear of each set of gears being fixedly connected to the shaft on which it is mounted, means for connecting the other gear of said sets to the shaft on which it is mounted, shifting rods, means for connecting said shifting rods to said gear connecting members, cylinders, pistons in said cylinders mounted on the ends of said shifting rods, and means for selectively connecting said cylinders to vacuum creating means whereby the pistons in said cylinders may be actuated by the vacuum created therein.

3. In a device of the class described, a housing, shafts rotatably journalled in said housing, sets of intermeshing gears mounted on said shafts, one gear of each set of gears being fixedly connected to the shaft on which it is mounted, means for connecting the other gear of said sets to the shaft on which it is mounted, shifting rods, means for connecting said shifting rods to said gear connecting members, cylinders, pistons in said cylinders mounted on the ends of said shifting rods, and means for selectively connecting said cylinders to vacuum creating means whereby the pistons in said cylinders may be moved toward the vacuum created therein, valve members disposed in the means connecting said vacuum creating means, means for successively opening certain of said valves, and manually controlled means for operating one of said other valves whereby said vacuum creating means may be connected to one of said cylinders.

4. In a device of the class described, a housing, shafts rotatably journalled in said housing, sets of intermeshing gears mounted on said shafts, one gear of each set of gears being fixedly connected to the shaft on which it is mounted, means for connecting the other gear of said sets to the shaft on which it is mounted, shifting rods, means for connecting said shifting rods to said gear connecting members, cylinders, pistons in said cylinders mounted on the ends of said shifting rods, and means for selectively connecting said cylinders to vacuum creating means whereby the pistons in said cylinders may be moved toward the vacuum created therein, valve members disposed in the means connecting said vacuum creating means, means for successively opening certain of said valves, and manually controlled means for operating one of said other valves whereby said vacuum creating means may be connected to one of said cylinders, and manually controlled valves supplemental to said first named manually controlled valves whereby said vacuum may be directed to certain of said cylinders at predetermined times.

5. In a device of the class described, a housing, shafts rotatably journalled in said housing, sets of intermeshing gears mounted on said shafts, one gear of each set of gears being fixedly connected to the shaft on which it is mounted, means for connecting the other gear of said sets to the shaft on which it is mounted, shifting rods, means for connecting said shifting rods to said gear connecting members, cylinders, pistons in said cylinders mounted on the ends of said shifting rods, and means for selectively connecting said cylinders to vacuum creating means whereby the pistons in said cylinders may be moved toward the vacuum created therein, valve members disposed in the means connecting said vacuum creating means, means for successively opening certain of said valves, and manually controlled means for operating one of said other valves whereby said vacuum creating means may be connected to one of said cylinders, manually controlled valves supplemental to said first named manually controlled valves whereby said vacuum may be directed to certain of said cylinders at predetermined times, said successively controlled valves being operated by a speed control mechanism, and means connected to one of said shafts for controlling said speed control mechanism.

In testimony whereof I hereby affix my signature.

LOUIS WOJTYCSKI.